No. 805,461. PATENTED NOV. 28, 1905.
W. F. HERRICK.
APPARATUS FOR PROMOTING COMBUSTION.
APPLICATION FILED JUNE 16, 1904.
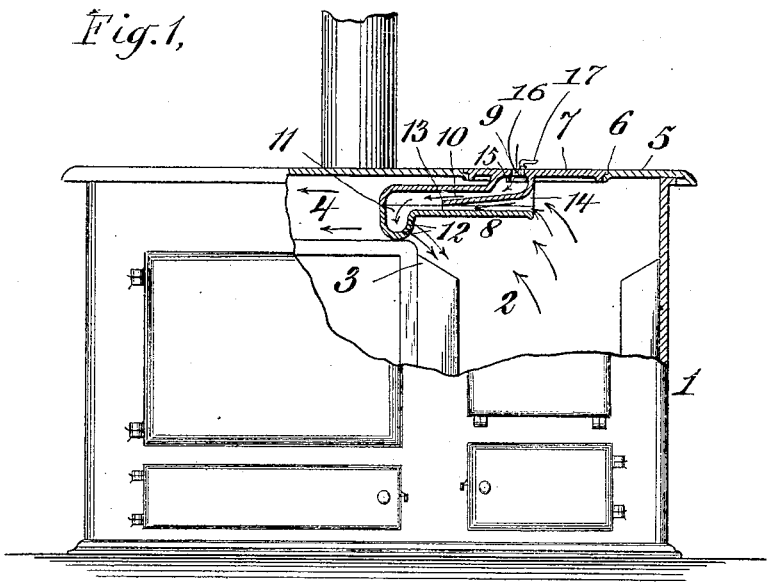
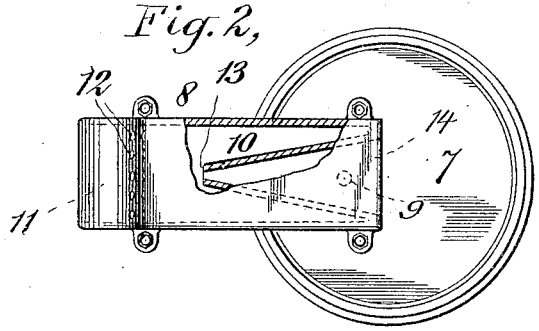
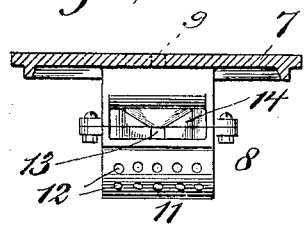
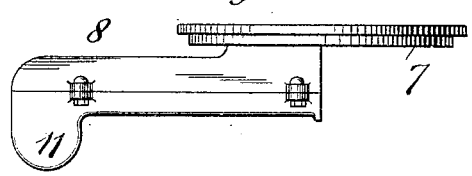
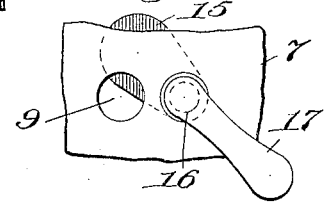
WITNESSES:
H. Crocheron
H. Burdick
INVENTOR
Wilbur F. Herrick
BY
Chapin Rayford Marble
his ATTORNEYS

UNITED STATES PATENT OFFICE.

WILBUR F. HERRICK, OF HAWORTH, NEW JERSEY, ASSIGNOR TO HERRICK COMPLETE COMBUSTION COMPANY, OF NEW YORK, N. Y., A CORPORATION OF MAINE.

APPARATUS FOR PROMOTING COMBUSTION.

No. 805,461.     Specification of Letters Patent.     Patented Nov. 28, 1905.

Application filed June 16, 1904. Serial No. 212,762.

*To all whom it may concern:*

Be it known that I, WILBUR F. HERRICK, a citizen of the United States, and a resident of Haworth, county of Bergen, State of New Jersey, have invented certain new and useful Improvements in Apparatus for Promoting Combustion, of which the following is a specification, reference being had to the accompanying drawings, forming a part thereof.

My invention relates to improvements in apparatus for promoting combustion, and particularly to means for introducing atmospheric air into the combustion-chamber of a furnace, stove, or the like and mixing the same with the hot products of combustion.

It is well understood, of course, that with the ash-pit and furnace-doors closed there is a tendency to vacuum in the combustion-chamber. This tendency to vacuum is utilized for the purpose of drawing in air to promote combustion. In order that air thus drawn in may be utilized to the best advantage, it is necessary to raise its temperature to a high degree. One reason for this is that carbon monoxid or the products of imperfect combustion require that the air shall be at a high degree of temperature before the oxygen thereof is available for combination therewith to produce carbon dioxid. In the formation of carbon dioxid more than three times the number of heat units are liberated than in the formation of carbon monoxid, and hence the conversion of all the carbon monoxid to carbon dioxid is desirable.

In carrying out my invention I provide a form of injector through which the currents of air induced by the lowering of pressure in the combustion-chamber must pass, and I utilize the inductive force of the current of air to carry back a certain portion of the products of combustion passing from the furnace, so that the temperature of the air will be raised by intimate contact with the hot products of combustion and the imperfectly-consumed products of combustion and air will be mixed together and returned to the combustion-chamber, where they will be consumed and oxygen supplied to consume the carbon monoxid evolved from the furnace.

The injector as a whole is preferably formed as a single article of manufacture arranged to be supported in the combustion-chamber above the burning fuel therein, whereby it may readily be applied to existing apparatus.

It will be understood that while I illustrate and describe herein a specific form of my invention as applied to kitchen stoves or ranges the same principle may be employed in promoting combustion in the combustion-chamber of other forms of furnaces—as, for instance, air-heaters, water-heaters, steam-boilers, and stoves of other and various kinds.

In the present embodiment of my invention I have employed my device in connection with a stove-lid, and I will now proceed to describe such embodiment and will then point out the novel features in claims.

In the drawings, Figure 1 is a front view of a kitchen range or stove, a portion thereof being broken away in vertical section and showing an apparatus embodying my invention in central vertical section. Fig. 2 is an under side view of one of the stove-lids to which my device is secured, a portion of the device being broken away in order to show other parts. Fig. 3 is a similar view in transverse section across the stove-lid. Fig. 4 is a side elevation of the same. Fig. 5 is a detail top view of a portion of the stove-lid, showing particularly the means for controlling admission of air.

In Fig. 1 I have shown an ordinary form of kitchen-range, the same being designated by reference character 1. A portion of the combustion-chamber is shown at 2, the products of combustion from which pass along over the bridge-wall 3 along a flue 4 in a manner well known. 5 is the top plate of the stove, provided with one or more of the usual openings 6, the one illustrated being fitted with a lid 7. The lid 7 forms a support for an injector, (designated as a whole by the reference character 8.) This injector is supplied with atmospheric air drawn in through an opening 9 and which passes along a passage 10 into a mixing-chamber 11 and through perforations 12 into the combustion-chamber. This air, which, as above stated, is drawn in by the tendency to vacuum in the combustion-chamber 2, is drawn in in a contiuous stream and passes the end of a nozzle 13. The nozzle 13 is open at its outwardly-flared end 14 to the combustion-chamber 2, and products of combustion will be drawn therethrough by the inductive force of the currents of air passing the nozzle end 13. The atmospheric air and the products of combustion will mix together in the mixing-chamber 11 and will be together discharged through the perforations 12. The temperature of the air thus brought in will be rapidly raised to a degree sufficient to make its oxygen available for the purpose of combining with the carbon monoxid to convert the same into carbon dioxid, and combustion will be thereby greatly promoted.

It will be understood, of course, that the furnace and ash-pit doors should be kept closed in order to make the operation of the device most effective, as otherwise air would be brought in therethrough, which would destroy the tendency to vacuum in the combustion-chamber relied upon to operate the injector.

It will be clear from the foregoing description that the injector principle above described may be equally well applied to combustion-chambers of almost every form, the result being the carrying back of some of the products of combustion by the inductive force of the currents of air and the mingling of the air with the products of combustion and the feeding of same together into the combustion-chamber.

I have shown means whereby the passage of air-currents through the device may be regulated and controlled, the same consisting of a gate 15 in proximity to the air-inlet 9. The said gate is pivotally mounted at 16, being provided with an operating-handle 17 exterior of the device. By manipulation of the operating-handle the gate may be swung laterally upon its pivot to control the air-inlet 9, as will be readily understood by reference to Fig. 5 of the drawings.

What I claim is—

1. An apparatus for promoting combustion comprising an injecting device having an air-inlet, an inlet for products of combustion and a mixing-chamber, the device including a nozzle for assisting the induction of the products of combustion by the air-currents flowing therethrough, and means for regulating and controlling the passage of air therethrough.

2. An apparatus for promoting combustion comprising two passages, one for furnace-gases and the other for entering air, one passage substantially surrounding the other, said apparatus further comprising a mixing-chamber in which the gas and air mingle, and arranged to deliver the mixed gases into a combustion-chamber, at a point above the fuel therein.

3. The combination, with a stove, of a device for promoting combustion connected to the top thereof and comprising an injector having passages for air and for products of combustion and a mixing-chamber in which said products and air mingle, said injector arranged to deliver the mixed gases into the combustion-chamber of the stove above the fuel therein and at about the point at which the products of combustion pass away from the combustion-chamber.

4. As an article of manufacture a stove-lid including a device for promoting combustion comprising an injecting device supported beneath same, said injecting device having an air-passage with an inlet through said lid, a passage for the products of combustion having an inlet arranged to open into the combustion-chamber of a stove with which the lid is employed, a mixing-chamber, and a discharge for the mixed gases arranged to discharge into the said combustion-chamber.

5. As an article of manufacture a stove-lid including a device for promoting combustion comprising an injecting device supported beneath same, said injecting device having an air-passage with an inlet through said lid, a passage for the products of combustion having an inlet arranged to open into the combustion-chamber of a stove with which the lid is employed, a mixing-chamber, and a discharge for the mixed gases arranged to discharge into the said combustion-chamber, said device including a nozzle for assisting the induction of the products of combustion by the air-currents flowing therethrough.

6. As an article of manufacture, a stove-lid including a device for promoting combustion comprising an injecting device supported beneath same, said injecting device having an air-passage with an inlet through said lid, a passage for the products of combustion having an inlet arranged to open into the combustion-chamber of a stove with which the lid is employed, and a mixing-chamber having a downwardly-turned end portion provided with orifices arranged to discharge the mixed gases rearwardly into the said combustion-chamber.

7. As an article of manufacture, a stove-lid provided on its under side with an injector, said injector having passages for entering air and for products of combustion and a mixing-chamber in which the entering air and products of combustion mingle, said mixing-chamber comprising a downwardly-turned portion having orifices arranged to discharge the mixed gases in a rearward direction.

8. An apparatus for promoting combustion comprising as a single article of manufacture, a device provided with means for supporting same in a combustion-chamber, above the burning fuel therein, said device including injecting means having an air-inlet, an inlet for products of combustion from the said combustion-chamber, a mixing-chamber, and a discharge for mixed gases, substantially as specified.

9. An apparatus for promoting combustion comprising a device adapted to be suspended in a combustion-chamber, above the burning fuel therein, said device including an injecting device having an air-inlet, an inlet for products of combustion arranged to open directly into the combustion-chamber and receive products of combustion therefrom, a mixing-chamber, and a discharge for the mixed gases arranged to deliver same directly into the combustion-chamber at a point above the fuel therein, substantially as specified.

WILBUR F. HERRICK.

Witnesses:
D. HOWARD HAYWOOD,
LYMAN S. ANDREWS, Jr.